Aug. 23, 1932.  W. E. GOLDSBOROUGH  1,872,934
GAS SEAL FOR COMPRESSION APPARATUS
Filed April 14, 1931
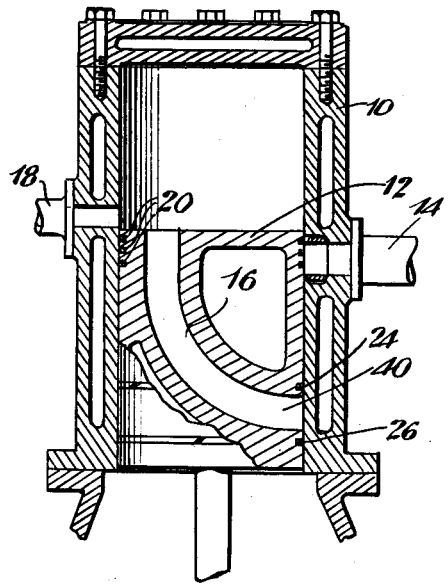
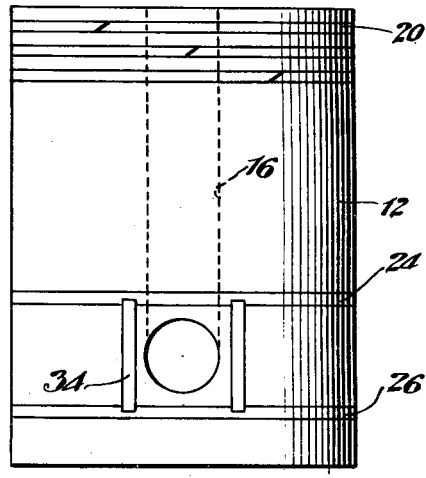
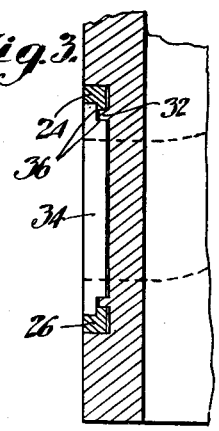
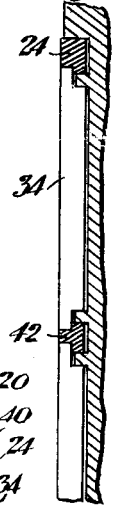
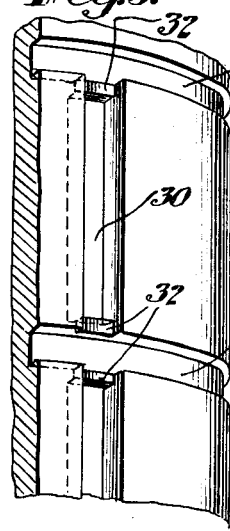
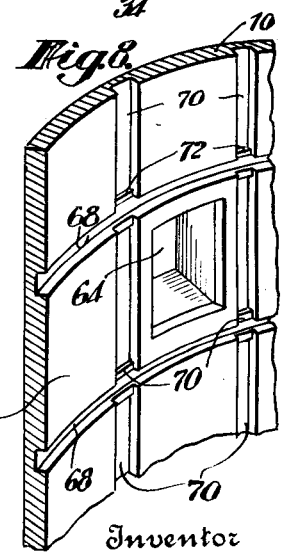
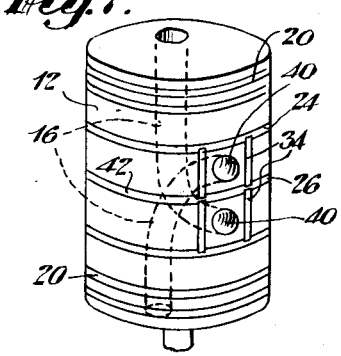
Inventor
WINDER E. GOLDSBOROUGH
By his Attorney
Edmund G. Borden Patented Aug. 23, 1932

1,872,934

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

GAS SEAL FOR COMPRESSION APPARATUS

Application filed April 14, 1931. Serial No. 529,987.

This invention relates to gas seals for apparatus employing cylinders having pistons movable therein, and more particularly it relates to seals for use with the air and gas compressors and combustion engines.

The present tendency in the development of compressors and internal combustion engines is in the direction of employment of higher compression pressures and correspondingly high combustion chamber temperatures. The use of these high pressures and temperatures makes vitally necessary the development of more efficient methods and means for preventing pressure escape through the off-take and exhaust passages from the compression chamber or combustion chamber prior to the point in the cycle of operation where the release of such pressure is desirable.

The poppet type of valve construction is not entirely suitable for the efficient maintenance of combustion chamber pressures as the higher range of pressures and temperatures are reached. On the other hand, ported or valveless engines are not normally adapted to the same free and effective utilization of pressure seal rings as has been the case in the older poppet valve types of engines.

Heretofore the construction of compression engines of the valveless type has been hampered because of the fact that the piston is subjected to the hot gases flowing in the valveless passageway over a considerable part of its circumference. This permits progressive movement of hot gas transversely along the grooved surface of the piston or cylinder, increasing the extent of contact between the side walls and the hot gases, and resulting in injury to or destruction of lubricating oil carried by the surfaces of the piston and cylinder.

Among the principal objects of the present invention are: To provide in an improved manner for preventing movement of gases under high pressure transversely along the surface of a piston or cylinder during compression or expansion; to provide for preventing progressive transverse movement of high pressure fluids adjacent a port opening in a piston or a cylinder wall; and to provide in an improved manner for increasing the range of port control of compression apparatus of the valveless simple or the valveless compound type.

In its broadest sense, the invention involves the provision of port seal strips of resilient metal disposed in longitudinal shallow slots or grooves provided in the cylindrical surface of a piston or cylinder,—the said strips being disposed between adjacent piston rings and being adapted to press outwardly against the adjacent surface of the cylinder during operation of the engine, if the strips are mounted in the piston,—or vice versa if the rings and strips are set into the cylinder wall, and the rings act to grip the piston.

In the accompanying drawing, illustrating certain preferred forms of the invention, Fig. 1 is a transverse section through an internal combustion engine of the valveless type, illustrating the present invention; Fig. 2 is an elevation of a piston of a valveless engine embodying the invention; Fig. 3 is a section through a portion of a piston side wall; Fig. 4 is a transverse fragmentary section through a piston side wall; Fig. 5 is a fragmentary perspective view of the cylindrical surface of a piston; Fig. 6 is a transverse section through a side wall of the piston of Fig. 5; Fig. 7 is a perspective view of a piston of a double acting engine embodying the invention; and Fig. 8 is a perspective view of a portion of a cylinder wall embodying the invention;

Referring to the drawing, 10 designates the cylinder of a compression engine having a piston 12 reciprocating therein. The engine is provided with an intake passage 14 which is adapted to register with one end of a passageway 16 within the piston, when the latter is in its uppermost position. An exhaust gas outlet passage 18 is so disposed as to be in communication with the cylinder space immediately above the piston 12 only when the latter is in, or immediately adjacent its lowermost position during reciprocation thereof in the cylinder 10.

The piston 12 is provided with the usual complement of expansible piston rings 20 located adjacent the head thereof in annular grooves. In addition thereto, piston rings 24, 26 are provided in grooves 28 formed in the piston 12, at points respectively immediately above and immediately below the inlet opening 40 in the side wall of piston 12 and closely adjacent thereto,—the piston rings 24 and 26 functioning in the same manner as rings 20.

Longitudinal slots 30 are provided in the piston side wall, the same extending between the respective grooves 28—28 therein. The upper and lower ends of these slots immediately adjacent the grooves 28—28 have shoulders 32—32 formed therein, thereby reducing the depth of the slots at these points and constituting shallow partition walls.

An elongated port seal strip 34 of resilient metal such as that of which the piston rings are made, is positioned in each of the slots 30, the respective upper and lower margins of each strip being adapted to contact with the adjacent surface of the respective piston rings 24—26 as shown. Each of the port seal strips 34 has its end margins provided with shoulders 36 which are adapted to cooperate with the shouldered portions 32 of the piston at the ends of the slot 30.

Each port seal strip 34 is of less thickness than the depth of the slot 30, thereby permitting the inner surface of the former to be spaced a substantial distance from the adjacent surface of the piston forming the bottom of the slot. This permits the port seal strips 34 to have bearing surfaces on the upper and lower piston rings 24 and 26,—between the latter of which the strips are free to expand both longitudinally and transversely while at the same time they are free to be carried laterally by the rings towards or from the cylinder wall by coaction with the said rings. The cylinder surface upon which the port seal strips 34 thereby press effects with the latter the same character of gas seal as that which is produced between the cylinder wall and the rings. It is understood, of course, that the grooves 28 are somewhat wider than the piston rings 24—26, thereby permitting limited free lateral expansion of the latter within the grooves.

During operation, the partition walls 32 constituting the shouldered portions within the slots 30 serve to separate the latter from the slot 28 carrying the piston rings 24 and 26 that support the strips 34, thereby effectively preventing progress along the slots 30 and therepast of any gas moving under pressure along the surface of the piston or cylinder between adjacent grooves 28. Advantage is taken of the spring or resilience of the piston rings 24 and 26 functioning normally to seal against vertical flow for assisting in bringing the transversely-effective sealing strips 34 into pressing engagement with the cylinder surface with which the transverse seal is to be made.

It will be obvious from the above description that in the ordinary practice of the invention, both longitudinal and transverse flow of high-pressure gases past the end of passageway 16 forming the side wall opening in piston 12 is substantially prevented. There is thus made possible a marked improvement in the degree of port control which may be secured in connection with the operation of port-controlled compressors and engines, and especially in those of the valveless simple or of the valveless multistage or compound type.

In Figs. 5, 6 and 7 is illustrated an application of the invention to a double-acting piston of well-known type, such as that disclosed in my copending application Serial No. 332,709 filed January 15th, 1929. As shown in Fig. 6 the piston 12 has a pair of passageways 16, 16, therethrough—one outlet 40 of each passageway being located in the side wall of the piston, and the other outlet of each of the respective passageways being located respectively in the piston head and in the bottom wall of the piston. A piston groove 28 is provided intermediate the outlets 40, 40; and an expansible piston ring 42 of T-shaped cross-section is mounted therein. Longitudinally disposed seal strips 34, 34 are provided, in the manner previously disclosed, in the piston side wall at opposite sides of the outlets 40, 40. The shouldered ends of the respective seal strips 34 adjacent the piston ring 42 freely contact therewith for lateral movement with the ring toward a cylinder wall with which it cooperates. The seal strips 34, 34, between adjacent pairs of piston rings need not necessarily be in longitudinal alignment with each other,—as will be apparent.

In the modification of the invention shown in Fig. 8, the inner wall surface 60 of the cylinder wall 10 is machined to accommodate a piston for reciprocation therein, in well known manner. One or more fluid intake and/or exhaust passageways 64 may be provided in the wall 10. One such passageway is shown in Fig. 8.

The cylinder carries a plurality of contractible cylinder rings of resilient metal, each mounted in one of a plurality of transverse grooves 68 in the cylinder wall 62.

Longitudinal slots 70 are provided in the cylinder wall 10, the same extending between adjacent lateral grooves 68, 68 therein. Shoulders 72, 72, are formed in the slots 70 adjacent the grooves 68, 68, in manner similar to the shoulders 32, 32, of Fig. 5, and for a like purpose.

A port seal strip of resilient metal, similar to those of Figs. 1 to 7, is positioned in each of the slots 70, and functions in manner similar to the first mentioned seal strips. Each seal strip is adapted to be moved outwardly toward the adjacent piston surface by pressure applied at its ends by the contractible cylinder rings. At least one of the port seal strips is positioned adjacent the outlet passageway 64 in the cylinder wall adjacent each of the lateral sides of such outlet.

It will be understood that the invention is not limited to a construction of the particular type here described. On the contrary, it may be employed in connection with other types of compressors and gas engines, including Otto and Diesel engines, and various types of fluid pressure motors, including steam engines and the like.

The invention is susceptible of modification within the scope of the appended claims:

I claim:

1. Apparatus comprising a cylinder and a piston reciprocating therein, resilient metal seal rings in lateral wall slots of one thereof, longitudinal wall slots each extending between and having its respective ends terminating in said lateral slots, and metal seal strips disposed in said longitudinal slots adapted to engage the rings in said lateral slots, and be forced into sealing position by the resiliency thereof.

2. Apparatus comprising a cylinder and a piston reciprocating therein, an opening in the side wall of said piston, metal seal rings in lateral piston wall slots disposed respectively immediately above and below said opening, longitudinal piston wall slots adjacent said opening on opposite sides thereof and extending between and terminating in said lateral slots, and metal port seal strips disposed in said longitudinal slots adapted to engage the rings in said lateral slots and be forced outwardly thereby.

3. Apparatus comprising a cylinder and a piston reciprocating therein, an opening in the side wall of said cylinder, metal seal rings in lateral piston wall slots, longitudinal piston wall slots laterally disposed at each side of said opening and extending between and terminating in said lateral slots, and metal seal strips disposed in said longitudinal slots adapted to engage the rings in said lateral slots, and be forced outwardly thereby.

4. Apparatus comprising a cylinder and a piston reciprocating therein, an opening in the side wall of said cylinder, metal rings in lateral cylinder wall slots disposed respectively immediately above and below said opening, longitudinal cylinder wall slots adjacent said opening and extending between and terminating in said lateral slots, and metal seal strips disposed in said longitudinal slots adapted to engage the rings in said lateral slots, and be forced against said piston by the resiliency of said rings.

5. Apparatus comprising a cylinder and a piston reciprocating therein, an opening in the side wall of said piston, metal seal rings in lateral cylinder wall slots, longitudinal cylinder wall slots out of longitudinal alignment with the said opening and extending between and terminating in said lateral slots, and metal seal strips disposed in said longitudinal slots adapted to engage the rings in said lateral slots, and be forced outwardly thereby.

6. A compression engine comprising a cylinder, a piston reciprocative therein, a passageway within the latter and having its respective ends in the top and in the side wall of the piston, piston rings disposed immediately below the last-named opening, and port seal strips disposed longitudinally of the piston between the said piston rings and closely adjacent the last-named opening in the piston side wall, the said strips being adapted to loosely engage with the said piston rings, and be forced outwardly thereby.

7. In a compression engine, a cylinder, a piston reciprocative therein, the said piston having an opening in its side wall, piston rings respectively disposed immediately above and immediately below the said opening, longitudinal slots in the piston adjacent the said opening in the piston wall and extending between the said piston rings, and port seal strips of resilient metal disposed in the said longitudinal slots and having their respective ends adapted to rest upon the corresponding piston rings, whereby said strips are forced against said cylinder by the resiliency of said piston rings.

8. A valveless compression engine comprising a cylinder, a piston reciprocative therein, a passageway within the latter having an end thereof in the side wall of the piston, piston rings disposed respectively immediately above and below the said opening, longitudinal port seal strips disposed in grooves at the respective sides of the opening between adjacent piston rings and adapted to have their marginal portions cooperate with the said piston rings to be forced thereby toward the cylinder wall.

9. A valveless compression engine comprising a cylinder, a piston reciprocative therein, a passageway within the latter and having an end in the piston side wall, piston rings disposed respectively above and below the said opening, longitudinal grooves in the piston extending between adjacent piston rings on each side of the said opening, shoulders in the piston at the marginal ends of each groove, a port seal strip of resilient material disposed in each of the said grooves, each of the strips having end margins adapted to cooperate with the first-mentioned shoulders, and with the said piston rings to be forced outwardly by the latter.

10. An engine comprising a cylinder, a piston reciprocative therein and having a plurality of piston rings, a plurality of longitudinal grooves in the piston, each of the said grooves extending between adjacent piston rings, a port seal strip of resilient material carried in each of the respective grooves and adapted to have its respective end margins freely carried upon and forced outwardly by the adjacent piston rings with its outer surface flush with the outer surface of said piston rings, each of said seal strips being less in thickness than the depth of the groove in which it is positioned.

11. A compression engine comprising a cylinder, a piston reciprocative therein, a plurality of piston rings carried in grooves by the piston, a plurality of longitudinal grooves in the piston side wall extending between adjacent piston ring grooves, the piston having shouldered portions adjacent the respective ends of each of the said longitudinal grooves, a port seal strip disposed in each of the respective longitudinal grooves, each of said seal strips having its respective ends shouldered for cooperation with the said shouldered portions of the piston for limiting the inward movement of the strip toward the cylindrical axis of the piston, the shouldered end margins of each strip being cooperatively associated with the adjacent piston rings for movement with the latter radially outward with respect to the cylindrical axis of the piston.

12. A port controlled compression engine comprising a cylinder, a piston reciprocative therein, two passageways within the latter, each of said passageways having an end thereof in the side wall of the piston, piston rings respectively disposed above one of the said passageways and below the other of said passageways, a piston ring disposed intermediate the said passageways, longitudinal grooves in the piston on each side of the piston side wall opening of the upper passageway, and extending between the upper and the intermediate piston rings, other similar longitudinal grooves in the piston extending between the intermediate piston ring and the said lower piston ring, and disposed respectively at the sides of the wall opening of the lower passageway, a port seal strip disposed in each of the respective grooves and adapted to have their marginal ends operatively connected with the corresponding piston rings for free movement with the latter co-radially with respect to the cylindrical axis of the piston, shoulder portions formed in the piston adjacent the respective end margins of each groove, shoulders formed at the respective ends of each of the said port seal strips adapted to cooperate with the first mentioned shoulder portions, and shoulders in the respective piston rings adapted to cooperate with the end margins of the corresponding port seal strips.

In testimony whereof I affix my signature.

WINDER E. GOLDSBOROUGH.